United States Patent
Aota et al.

(10) Patent No.: US 7,665,651 B2
(45) Date of Patent: Feb. 23, 2010

(54) METHOD OF JOINING TWO MEMBERS BY FRICTION STIR WELDING

(75) Inventors: Kinya Aota, Kudamatsu (JP); Tsuyoshi Takenaka, Yamaguchi-Ken (JP); Yasuo Ishimaru, Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/453,034

(22) Filed: Jun. 15, 2006

(65) Prior Publication Data

US 2006/0254187 A1 Nov. 16, 2006

Related U.S. Application Data

(62) Division of application No. 10/600,573, filed on Jun. 23, 2003, now Pat. No. 7,073,701, which is a division of application No. 08/820,231, filed on Mar. 18, 1997, now Pat. No. 6,581,819.

(30) Foreign Application Priority Data

Mar. 19, 1996 (JP) .................. 8-62491

(51) Int. Cl.
*B23K 20/12* (2006.01)
(52) U.S. Cl. .................. 228/112.1; 228/2.1
(58) Field of Classification Search .......... 228/112.1, 228/2.1; 52/578, 592.1, 593.1; 428/598, 428/593
See application file for complete search history.

(56) References Cited

U.S. PATENT DOCUMENTS 1,954,511 A 4/1934 Adams, Jr.
2,284,229 A * 5/1942 Palmer .................. 52/578
3,385,182 A * 5/1968 Harvey .................. 404/35

(Continued)

FOREIGN PATENT DOCUMENTS

EP 0 579 500 A1 1/1994

(Continued)

OTHER PUBLICATIONS

Friction Stir Process Welds Aluminum Alloys, Welding Journal, American Welding Society, Vo. 75, No. 3 (Mar. 1996).

(Continued)

*Primary Examiner*—Richard E Chilcot, Jr.
*Assistant Examiner*—Jessica Laux
(74) *Attorney, Agent, or Firm*—Antonelli, Terry, Stout & Kraus, LLP.

(57) ABSTRACT

This invention provides a configuration of a joint that allows a satisfactory welded joint to be formed with reduced deformation of the joint region when two-face structures (panels) are friction-welded end to end. The panels 31, 32 each have two substantially parallel plates 33, 34 and a third member 35 connecting the two plates 33, 34. The end portions of the plates 33, 34 of one panel 32 are friction-welded to the end portions of the plates 33, 34 of the other panel 32. At least one of the panels has a plate 36 at its end for connecting the plates 33 and 34 and has a rigidity to support a pressing force produced during the friction welding.

12 Claims, 8 Drawing Sheets

U.S. PATENT DOCUMENTS

| | | | |
|---|---|---|---|
| 3,386,221 A * | 6/1968 | Giovannucci | 52/578 |
| 3,849,871 A | 11/1974 | Kaunitz | |
| 3,984,961 A * | 10/1976 | Chieger et al. | 52/592.1 |
| 4,966,082 A * | 10/1990 | Takeichi et al. | 105/422 |
| 5,098,007 A | 3/1992 | Tsuruda et al. | |
| 5,140,913 A * | 8/1992 | Takeichi et al. | 105/397 |
| 5,388,529 A | 2/1995 | Tieberghien et al. | |
| 5,449,107 A | 9/1995 | Umeno et al. | |
| 5,460,317 A | 10/1995 | Thomas et al. | |
| 5,794,835 A | 8/1998 | Colligan et al. | |
| 5,813,592 A | 9/1998 | Midling et al. | |
| 5,979,742 A | 11/1999 | Enomoto et al. | |
| 6,045,027 A | 4/2000 | Rosen et al. | |
| 6,193,137 B1 | 2/2001 | Ezumi et al. | |
| 6,250,037 B1 | 6/2001 | Ezumi et al. | |
| 6,290,117 B1 | 9/2001 | Kawasaki et al. | |
| 6,305,866 B1 | 10/2001 | Aota et al. | |
| 6,382,498 B2 | 5/2002 | Aota et al. | |
| 6,413,610 B1 | 7/2002 | Nakamura et al. | |
| 6,422,449 B1 | 7/2002 | Ezumi et al. | |
| 6,474,533 B1 | 11/2002 | Ezumi et al. | |
| 6,494,011 B2 | 12/2002 | Ezumi et al. | |
| 6,527,470 B2 | 3/2003 | Ezumi et al. | |
| 6,536,651 B2 | 3/2003 | Ezumi et al. | |
| 6,581,819 B1 | 6/2003 | Aota et al. | |
| 6,582,831 B2 | 6/2003 | Ezumi et al. | |
| 6,585,443 B2 | 7/2003 | Aota et al. | |
| 6,607,837 B2 | 8/2003 | Aota et al. | |
| 6,619,534 B2 | 9/2003 | Aota et al. | |
| 6,640,515 B1 | 11/2003 | Aota et al. | |
| 6,691,484 B2 | 2/2004 | Ezumi et al. | |
| 6,733,900 B2 | 5/2004 | Satou et al. | |
| 6,755,884 B2 | 6/2004 | Naito et al. | |
| 6,793,117 B2 | 9/2004 | Ezumi et al. | |
| 6,840,426 B2 | 1/2005 | Aota et al. | |
| 6,862,860 B2 | 3/2005 | Aota et al. | |
| 2001/0011671 A1 | 8/2001 | Aota et al. | |
| 2001/0011672 A1 | 8/2001 | Aota et al. | |
| 2001/0011673 A1 | 8/2001 | Aota et al. | |
| 2002/0027154 A1 | 3/2002 | Satou et al. | |
| 2002/0092889 A1 | 7/2002 | Ezumi et al. | |
| 2003/0042293 A1 | 3/2003 | Ezumi et al. | |
| 2004/0069833 A1 | 4/2004 | Aota et al. | |
| 2004/0069834 A1 | 4/2004 | Aota et al. | |
| 2004/0069835 A1 | 4/2004 | Aota et al. | |
| 2004/0074949 A1 | 4/2004 | Narita et al. | |
| 2004/0211819 A1 | 10/2004 | Ezumi et al. | |
| 2005/0051601 A1 | 3/2005 | Ezumi et al. | |

FOREIGN PATENT DOCUMENTS

| | | |
|---|---|---|
| EP | 0 797 043 A2 | 9/1997 |
| EP | 1 188 507 A2 | 3/2002 |
| EP | 1 222 997 A1 | 7/2002 |
| JP | 51-111925 | 3/1975 |
| JP | 54-11250 | 5/1979 |
| JP | 57-112813 | 12/1980 |
| JP | 60-166177 | 8/1985 |
| JP | 2-57749 | 2/1990 |
| JP | 402246863 A | 10/1990 |
| JP | 6-106661 | 4/1994 |
| JP | 6-156272 | 6/1994 |
| JP | 7-505090 | 6/1995 |
| JP | 7-266068 | 10/1995 |
| JP | 7-33016 | 2/1996 |
| JP | 9-221024 | 8/1997 |
| JP | 10-216964 | 8/1998 |
| JP | 2003-94179 | 4/2003 |
| JP | 2003-136258 | 5/2003 |
| JP | 2003-311443 | 5/2003 |
| WO | WO 93/10935 | 6/1993 |
| WO | WO 95/26254 | 10/1995 |

OTHER PUBLICATIONS

Light Metal Welding vol. 33, No. 7, pp. 19-26 (Jul. 1995).
Two Prints dated Jun. 23, 1993 showing details from a video from the Welding Institute.
Verksstadnerna Nr 2, pp. 32 and 34 (Feb. 1996).
Advanced Materials & Processes, pp. 22-23 (Sep. 1993).
Metalworking Technology Europe, Sterline Publication, pp. 143-145, (1994).
An Introduction to Friction Stir Welding and its Development, by C.J. Dawes, Welding & Metal Fabrication, pp. 13-16 (Jan. 1995).
TWI-World Centre for Materials Joining Technology, Bulletin 6, vol. 36, 10 pages, Nov./Dec. 1995.
27$^{th}$ ISATS, pp. 422-431, Oct. 1994.
The 4$^{th}$ International Conference on: Aluminum Alloys, vol. I, Conference Proceedings, pp. 450-457, Sep. 1994.

* cited by examiner

METHOD OF JOINING TWO MEMBERS BY FRICTION STIR WELDING

This application is a Divisional application of application Ser. No. 10/600,573, filed Jun. 23, 2003, now U.S. Pat. No. 7,073,701 which is a Divisional application of application Ser. No. 08/820,231, filed Mar. 18, 1997, now U.S. Pat. No. 6,581,819 the contents of which are incorporated herein by reference in their entirety.

BACKGROUND OF THE INVENTION

The present invention relates to a friction stir welding method that is applicable to panel welding used, for example, in aluminum alloy railway cars and buildings.

A two-face structure (panel) for railway cars using hollow members is disclosed in Japanese Patent Laid-Open No. 246863/1 990, and another using laminated panels, such as honeycomb panels, is disclosed in Japanese Patent Laid-Open No. 106661/1994.

The process of friction stir welding is performed by rotating a round rod inserted in a joint region to heat and plasticize the joint region thus forming a weld. This type of welding is generally applied to a butt joint and a lap joint, and is described in WO 93/10935 (which is the same as EP 061 5480B1 and the Japanese Announcement laid-open publication No. Hei 7-505090 and in the publication Welding & Metal Fabrication, January 1995, pp. 13-16.

SUMMARY OF THE INVENTION

In friction stir welding, the reaction of the plasticized metal being extruded from immediately beneath the rotating tool (round rod) to the surface during the welding results in a downward force acting on the joint region.

Thus, when this welding method is applied to a two-face structure (panel), this downward force causes the joint material at the joint region to flow downward, deforming the joint. This makes it impossible to produce a satisfactory weld.

Two-face structures (panels) include hollow members made of extruded aluminum alloy and honeycomb panels. Joining such panels has been accomplished by MIG welding and TIG welding. When friction stir welding is applied to such a joint, the joint is bent down or the material in the joint region is forced to flow down due to a downward force produced during the friction stir welding.

The inventor has found the above phenomena in a variety of experiments.

It is a first object of this invention to provide a satisfactory welded joint by minimizing deformation of the joint region when two faces are friction stir welded.

It is a second object of this invention to provide a satisfactory welded joint when one face is friction stir welded.

It is a third object of this invention to enable two faces to be welded together in a short time with little deformation.

The first object can be achieved by placing at the joint region a connecting member that joins two plates forming two faces.

The second object is realized by providing the members at the joint region with a raised portion that protrudes toward the friction stir welding tool side.

The third object is realized by disposing rotary tools for friction stir welding on both sides of the objects to be welded, placing the rotation center of one of the tools on an extension of the rotation center of the other tool, and performing friction stir welding simultaneously.

DESCRIPTION OF THE PREFERRED EMBODIMENTS

Figure 1:
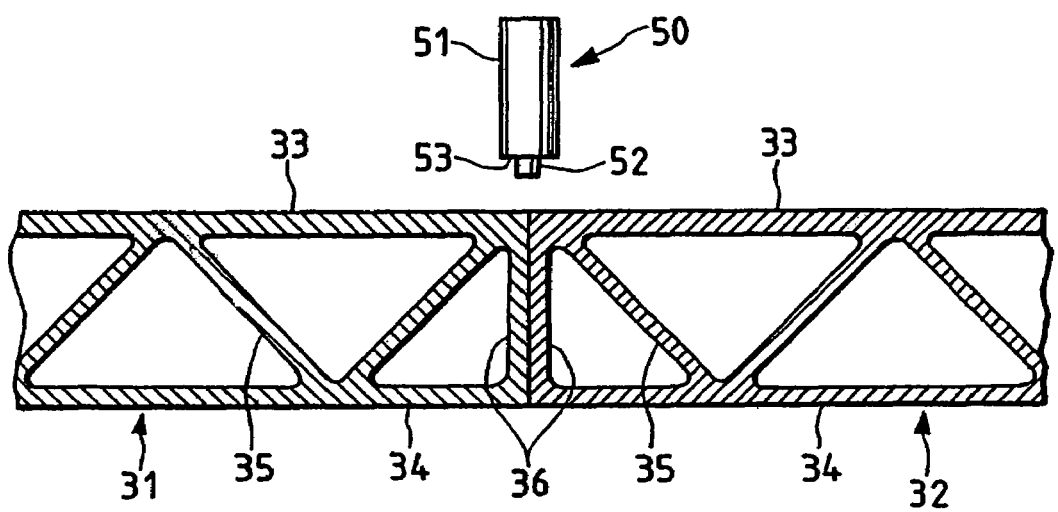
FIG. 1 is a vertical cross section of one embodiment of this invention.

The embodiment shown in FIG. 1 has a joint configuration of the abutting type between hollow members 31, 32 which are in the form of panels. The hollow members 31, 32 have vertical plates 36, 36 at their ends in the width direction. Before the welding, the vertical plates 36, 36 are disposed immediately beneath a rotary tool 50. The vertical plates 36, 36 are opposed to and in contact with each other. If they are spaced apart, the distance is small and approximately 1 mm. On the extension of the interface between the vertical plates 36, 36 lies the center of a projection 52. The vertical plates 36, 36 have a stiffness which is sufficiently strong to sustain the downward force mentioned earlier. The vertical plates 36 are perpendicular to two plates 33, 34 in each panel. The hollow members 31, 32 are formed by extruding an aluminum alloy. The upper and lower faces of the hollow member 31 are flush with the corresponding upper and lower faces of the hollow member 32. That is, the hollow members 31, 32 have the same thickness. This is true also of the succeeding embodiments. During the friction stir welding process, the boundary 53 between a large-diameter portion 51 and the projection 52 of a small-diameter of the rotary tool 50 is situated above the upper surfaces of the hollow members 31, 32. Numeral 35 designates a plurality of members that are arranged in the form of trusses to connect the two plates 36, 36. The hollow members 31, 32 each have bilaterally symmetrical end portions and are mounted on a bed (not shown) where they are fixed immovably. The bed also lies under the vertical plates 36, 36.

The friction stir welding process is performed by rotating the tool 50, plunging the projection 52 into the joint region of the hollow members 31, 32, and moving the projection 52 along the joint region. The rotating center of the projection 52 is located between the two vertical plates 36, 36.

Figure 2:
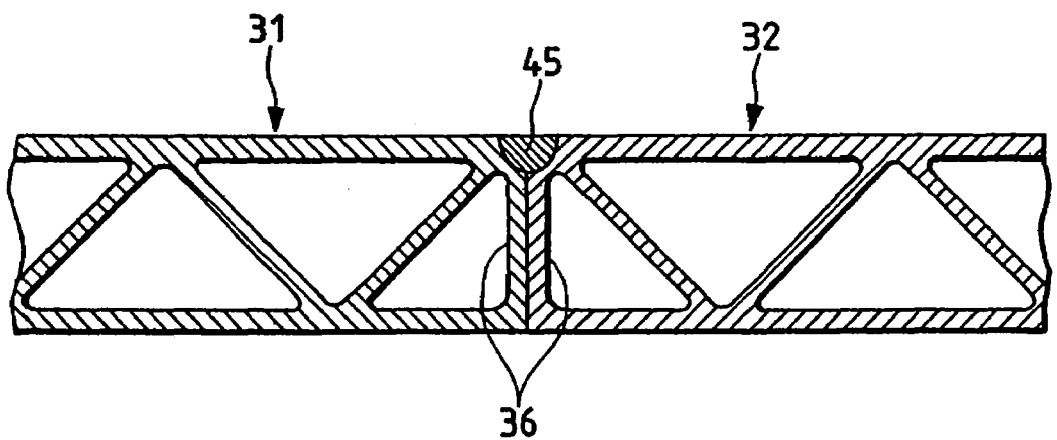
FIG. 2 is a vertical cross section of FIG. 1 after friction stir welding.

FIG. 2 shows the two panels after they have been friction stir welded. Reference number 45 denotes the shape of a weld bead after welding. On the extension of the border line between the vertical plates 36, 36 the width center of the weld bead 45 is situated. The bead 45 lies in an area on the extension of the thickness of the vertical plates 36, 36. The depth of the weld bead 45 is determined by the height of the projection 52 at the lower end of the rotary tool 50 inserted in the joint region.

With this construction, because the vertical plates 36, 36 perpendicular to the plates 33, 34 sustain the vertical force produced during the friction stir welding, the joint region does not bend, offering a satisfactory joint as shown in FIG. 2. The vertical plate 36 is made perpendicular to the plates 33, 34 in each panel as much as possible.

The vertical plate 36 may be perforated to achieve a lighter weight. This is true also of the succeeding embodiments.

Welding of the lower side is carried out by turning the hollow panel members upside down after the welding of the one side is completed.

Figure 3:
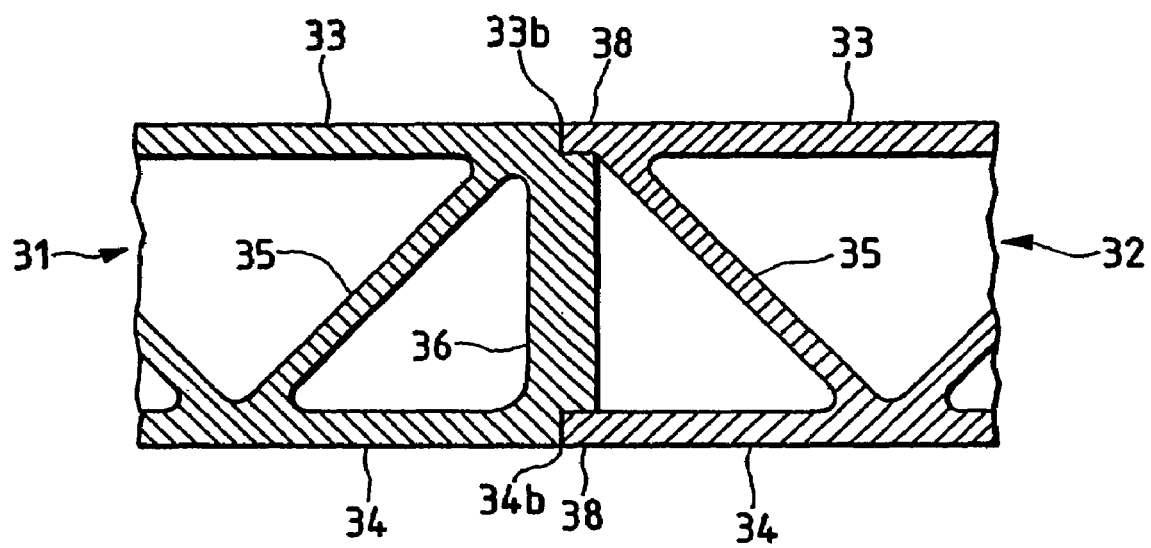
FIG. 3 is a vertical cross section of another embodiment of this invention.

The embodiment of FIG. 3 has a vertical plate 36 at the end of one hollow member 31, but not at the opposing end of the other hollow member 32. Corners in the vertical direction of the vertical plate 36 of the hollow member 31 are recessed so as to receive the ends of projecting pieces 38, 38 of the hollow member 32. These recessed portions are open in a direction of the thickness of the hollow member 31 and in a direction perpendicular to the thickness direction (toward the hollow member 32 side). When the projecting pieces 38 are placed (superposed) on the recessed portions, there is actually a clearance between them although they are in contact with each other in the figure. There is also a gap between the front ends of these members (i.e., between the projecting pieces 38, 38 and the corners 33*a*, 34*b*). The abutting joint portions on the upper face side of the two hollow members 31, 32 and the vertical plate 36 are situated directly below the center of the rotary tool 50. The rotating center of the projection 52 of the welding tool 50 is disposed on an extension of the center line of the thickness of the vertical plate 36. That is, the joint region of the plate 33 (34) and plate 33 (34) is situated on the extension of the center line of the thickness of the vertical plate 36. The corners 33*b*, 34*b* extending from the plates 33, 34 to the recessed portions lie on an extension of the center line of the thickness of the vertical plate 36. Considering the gap between the corners 33*b*, 34*b* and the projecting pieces 38, the corners 33*b*, 34*b* are situated slightly to the left of the extension of the center line of the thickness of the vertical plate 36. The vertical plate 36 has a rigidity to support the downward force. The horizontal gap between the front ends of the projecting pieces 38 and the hollow member 31 is similar to that shown in FIG. 1. The height of the projection 52 of the welding tool 50 is approximately equal to the thickness of the projecting piece 38. The region that is plastic and fluid extends below the projecting piece 38, and comes to have an area larger than the diameter of the projection 52, and the two hollow members 31, 32 are friction stir welded. It is desirable that the friction stir weld be so formed as to extend beyond the contact area between the underside of the projecting piece 38 and the vertical plate 36.

Figure 4:
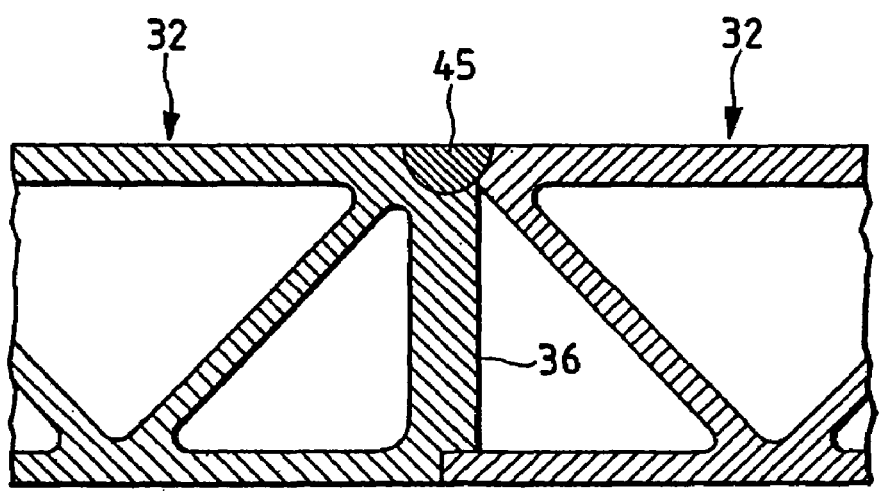
FIG. 4 is a vertical cross section of FIG. 3 after friction stir welding.

FIG. 4 shows the state of the joint after being welded. The weld bead 45 is formed such that the width center of the weld bead 45 is situated on an extension of the thickness center of the vertical plate 36.

To support the vertical force, it is desirable for the rotating center of the tool 50 to be located on the extension of the center line of the thickness of the vertical plate 36. To make the quantity of the joint of the left and right hollow members 31, 32 equal, it is desirable for the corners 33*b*, 34*b* to be situated on the extension of the thickness center line of the vertical plate 36. While the projection 52 of the tool 50 should preferably be placed in the range between extension lines of the thickness of the vertical plate 36, the thickness of the vertical plate 36 is determined by the vertical force, the position of the projection 52 and the strength of the vertical plate 36. Hence, there may be a case in which the thickness of the plate 36 is smaller than the diameter of the projection 52. In view of the possible errors of the position of the rotary tool 50 and those of the corners 33*b*, 34*b*, it is desirable for the corners 33*b*, 34*b* to be positioned in the range between extension lines of the thickness of the vertical plate 36, and at least a part of the projection 52 of the tool 50 to be situated in this range. This arrangement enables the vertical plate 36 to receive at least a part of the vertical force, substantially preventing the deformation of the joint. As a result, a satisfactory joint can be formed. When the bead 45 is taken as a reference, although the bead 45 is slightly larger than the projection 52, the same as above can be said. This is true also of the other embodiments.

Compared with the case of FIG. 1, this joint configuration can minimize a sinking in the surface of the joint region even when the horizontal gap between the projecting piece 38 and the hollow member 31 is large. As a result, the joint has a good appearance and requires a reduced amount of putty for painting. This is because the gap between the two members is terminated at a depth equal to the thickness of the projecting piece 38. It is also considered that this joint configuration can reduce the weight. Further, because one of the hollow members is fitted into the other, the positioning in the height direction of the two members can be accomplished easily.

The ends of the hollow member 31 are bilaterally symmetrical in shape. The ends of hollow member 32 are also bilaterally symmetrical. Alternatively, the hollow member 31 may have one end shaped as shown in FIG. 3 and the other end shaped like the end of the hollow member 32 of FIG. 3.

Figure 5:
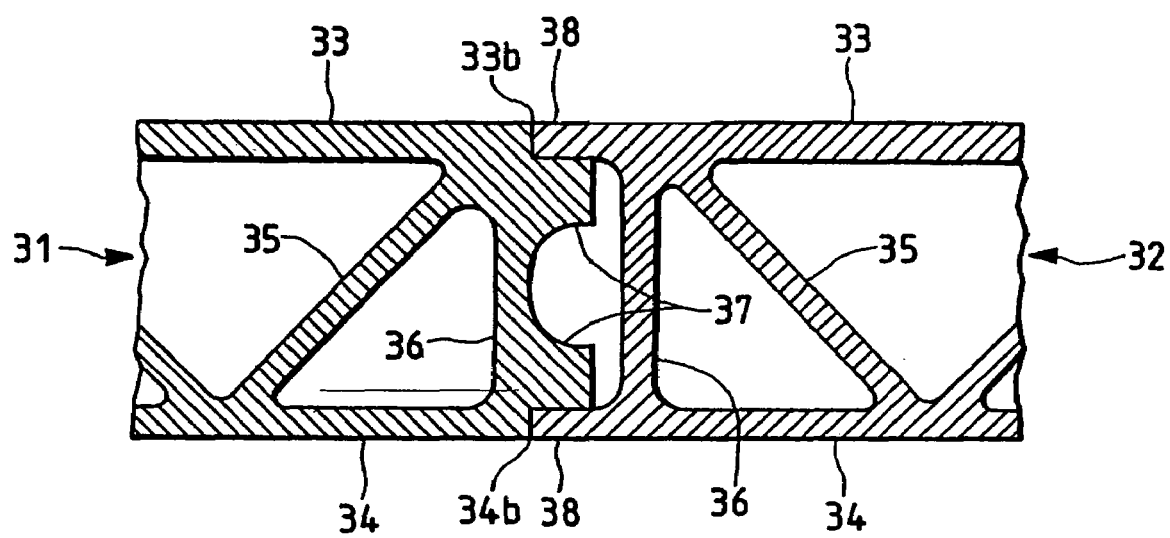
FIG. 5 is a vertical cross section of another embodiment of this invention.
Figure 6:
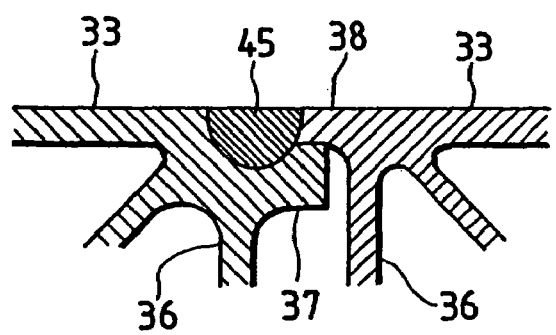
FIG. 6 is a vertical cross section of FIG. 5 after friction stir welding.

In the embodiment of FIG. 5, there is virtually no vertical plate 36 immediately below the corners 33*b*, 34*b* of the recessed portion of the hollow member 31. The right end of the vertical plate 36 lies on the extension of the corners 33*b*, 34*b*. On this extension the rotating center of the tool 50 is located. The end portion of the hollow member 31 is given a rigidity to sustain the vertical force by making the lower projecting piece 37 at the joint thicker and increasing the size of the arcs extending from the front ends of the projecting pieces 37 to the plate 36. The projecting pieces 38 of the other hollow member 32 are received in the recessed portions of the projecting pieces 37, as in the preceding embodiment of FIG. 3. The second hollow member 32 has a vertical plate 36 near the projections 38 for connecting the upper and lower plates 33, 34. This arrangement prevents the joint region from being defective even when there is no vertical plate 36 directly below the corners of the recessed portions. It is noted, however, that below the range of the bead 45 there is a vertical plate 36 of the panel 31. FIG. 6 shows the state after welding.

In the embodiment of FIG. 5, the plate 36 of the hollow member 32 may be removed.

Figure 7:
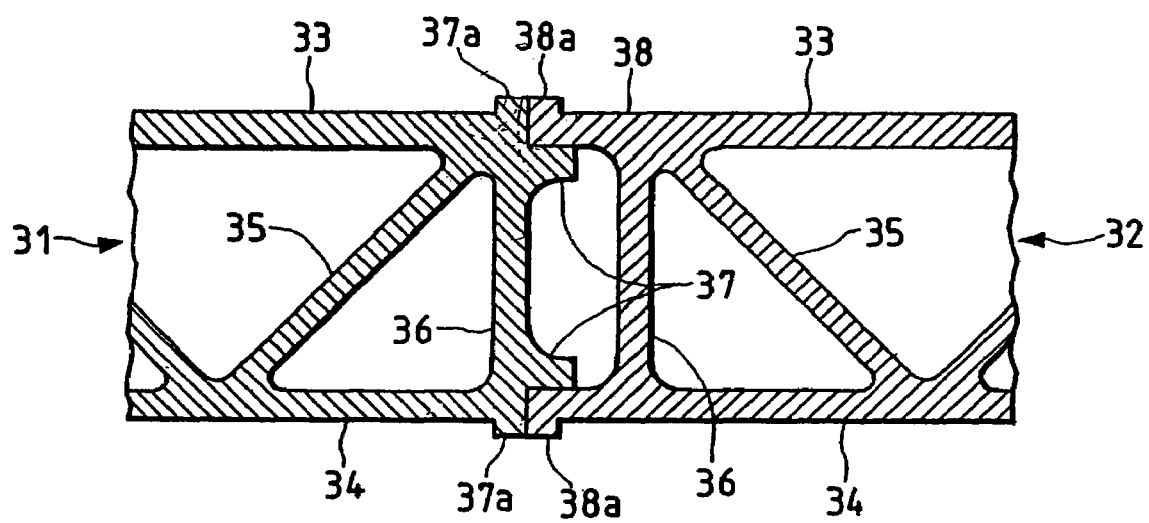
FIG. 7 is a vertical cross section of still another embodiment of this invention.

FIG. 7 shows another embodiment, representing a variation of the preceding embodiment of FIG. 5, in which the joint region of the two hollow members 31, 32 is provided with raised portions 37*a*, 38*a* protruding outside. This makes the joint region thick. The heights of the raised portions 37*a*, 38*a* are equal. Other parts are similar to those of FIG. 5, except that the vertical plate 36 and the projections 37 are slightly thinner.

With this configuration, if there is a gap between the raised portions 37a and 38a before welding, the gap is filled with the material of the raised portions 37a, 38a, when welded, improving the appearance and reducing the amount of putty required.

Figure 8:
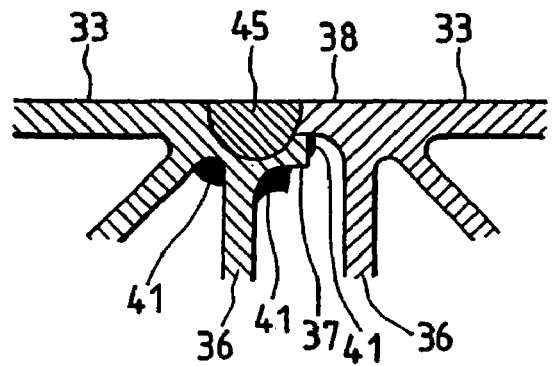
FIG. 8 is a vertical cross section of FIG. 7 after friction stir welding.

In conventional welded joints, the weld bead has a sunken portion or recess corresponding to the volume of the lost material 41 that has flowed down due to the downward force. In the joint configuration of FIG. 7, the rotary tool 50 plasticizes the raised portions 37a, 38a and forces them downward making up for the lost volume of the material 41. Thus, formation of recess can be prevented, providing a satisfactory welded joint. FIG. 8 shows the shape of bead 45 after welding. After welding, unnecessary parts, if any, are cut off as shown.

The raised portions 37a, 38a can also be applied to the embodiments of FIG. 1, 3 and 5 and to subsequent embodiments.

FIGS. 9(A)-9(D) show a further embodiment, which allows welding at the upper and lower faces from only one side. The ends of the hollow members 31, 32 on the lower side having projecting pieces 34a, 34a protruding flush with the lower plates 34, 34 substantially toward the opposing hollow member sides. The front ends of the projecting pieces 34a, 34a are virtually in contact with each other. The front ends of the upper plates 33, 33 are offset back from the front ends of the lower plates 34a, 34a. The front ends of the upper plates 33, 33 are connected to the lower plates 34, 34 through the vertical plates 36, 36. The vertical plates 36, 36 are connected to intermediate portions of the lower plates 34. The top portions of the vertical plates 36, 36 are provided with recessed portions 39, 39 that receive a joint 60. When mounted on the recessed portions 39, 39, the upper surface of the joint 60 is flush with the upper face of the upper plates 33, 33. The distance between the two vertical plates 36, 36 is long enough for the rotary tool 50 to be inserted and is as short as possible. The relation between the vertical plates 36 and the recessed portions 39 is the same as explained with reference to the embodiments of FIG. 5 and FIG. 7.

Figure 9A:
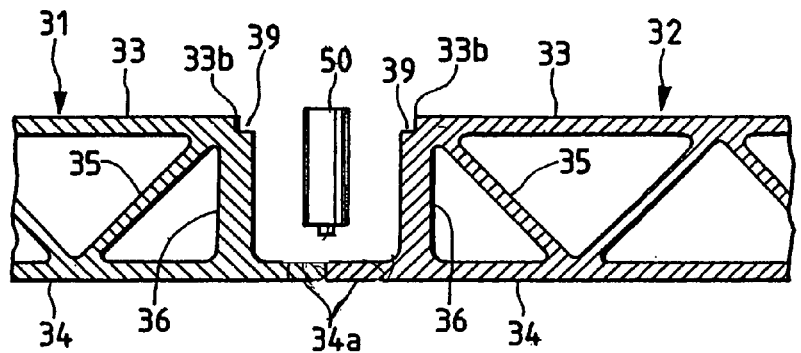
FIG. 9(A) to 9(D) are vertical cross sections showing steps in the procedure of friction stir welding of a further embodiment of this invention.

The welding procedure will be described below. In the state of FIG. 9(A), the abutting ends of the lower plates 34a, 34a are welded by the rotary tool 50. At this time, the hollow members 31, 32, including the joint region of the plates 34a, 34a, are mounted on a bed. The upper surface of the bed (that backs the bead) is flat. The height of the projection 52 of the rotary tool 50 is smaller than the thickness of the plates 34a, 34a. This design ensures that the bottom surface after welding is flat. Thus, the bottom side can easily be used as an outer surface of the structure of a railway car or a building (the outer surface being the surface on which no decorative plate is mounted). Generally, the upper face of the friction stir welded joint tends to be uneven (at a boundary portion 51).

Figure 9B:
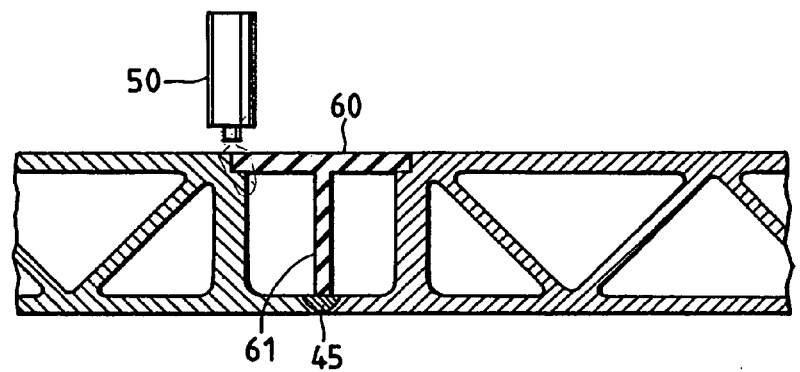

Next, as shown in FIG. 9(B), the joint 60 is mounted between the two hollow shape members 31, 32. The joint 60 in the illustrated example is T-shaped in vertical cross section. When both ends of the joint 60 are placed on the recessed portions 39, 39, the lower end of a vertical portion 61 has a clearance between it and the weld bead on the lower plate. The vertical portion 61 may be omitted.

Figure 9C:
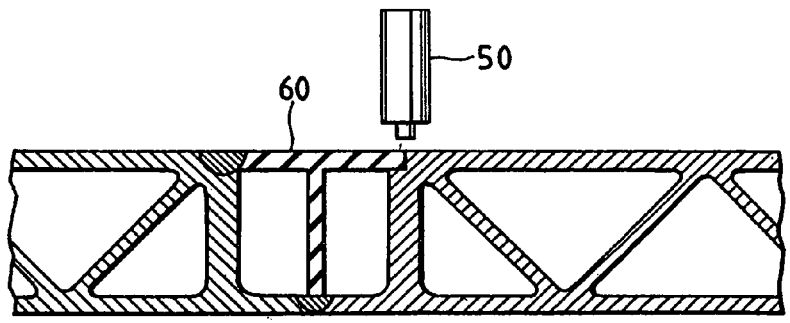

Next, as shown in FIG. 9(C), the joint portion between the joint 60 and the hollow member 31 is friction stir welded by the rotary tool 50. The rotary tool 50 need not be the same as used for the weld illustrated in FIG. 9(A).

Figure 9D:
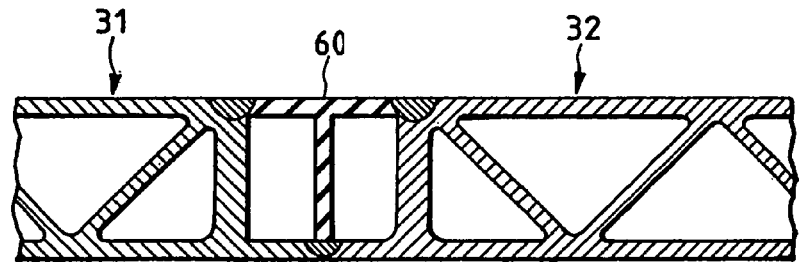

Then, as shown in FIG. 9(D), the joint portion between the joint 60 and the hollow member 32 is friction stir welded by the rotary tool 50.

This procedure allows the welding to be performed from one side and eliminates the need for inversion of the panels. With the inversion of the panels eliminated, there is an advantage that the time required for inversion and positioning and need for an inversion device are unnecessary, and even the assembly precision is improved.

Figure 10:
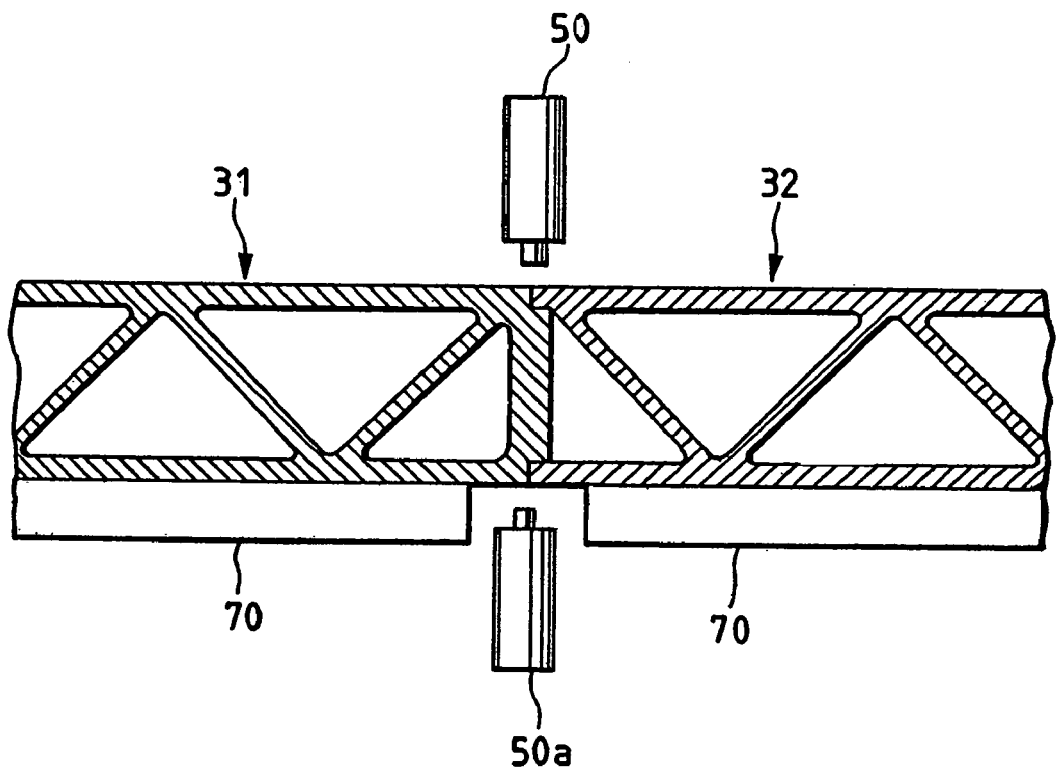
FIG. 10 is a vertical cross section of a further embodiment of this invention.

FIG. 10 shows another embodiment, in which both the upper and lower sides of the hollow members 51, 52 are friction stir welded at the same time. A rotary tool 50a for the lower side is disposed vertically below the welding tool 50 for the upper side. The projection 52 of the second welding tool 50a faces up. The two welding tools 50, 50a facing each other are moved at the same speed to perform friction stir welding. Denoted by 70, 70 are beds (tables). The rotating centers of the tools 50 and 50a are on the same line on which the joint region of the hollow shape members 31, 32 is located.

Because with this arrangement the rotating center of the second tool 50a is positioned on the extension of the rotating center of the first tool 50, the forces applied to the panels balance with each other allowing the joint to be welded in a short time with little deformation. Further, because there is no need to invert the hollow members 31, 32, the welding can be performed in a short time with little deformation of the joint.

This procedure can be applied to other embodiments.

Figure 11:
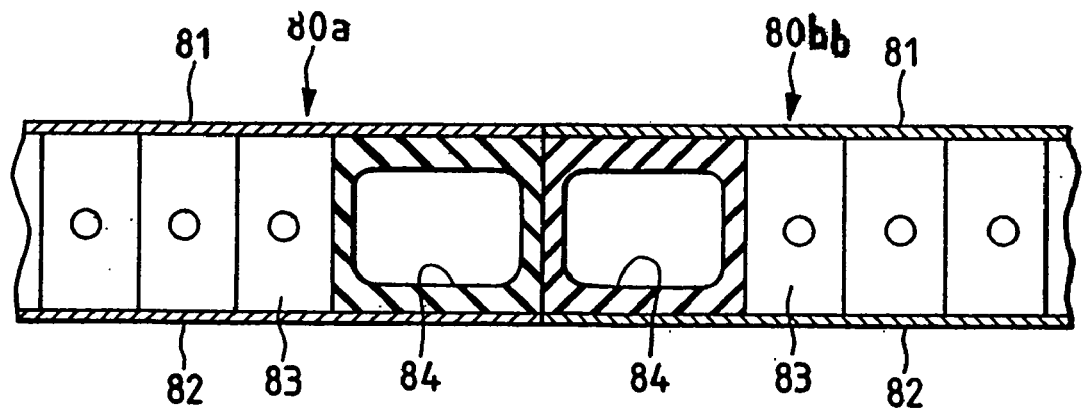
FIG. 11 is a vertical cross section of a further embodiment of this invention.

The preceding embodiments have used hollow members as panels to be joined. The following embodiments show friction stir welding as applied to honeycomb panels. As shown in FIG. 11, the honeycomb panels 80a, 80b comprise two surface plates 81, 82, core members 83 having honeycomb-like cells, and edge members 84 arranged along the edges of the surface plates 81, 82, with the core members 83 and the edge members 84 soldered to the surface plates 81, 82 to form integral structures. The surface plates 81, 82, the core members 83 and the edge members 84 are made of aluminum alloy. The edge members 84 are made by extrusion and have a rectangular cross section. All sides of this rectangular cross section are greater in thickness than the surface plates 81, 82. The vertical sides of the mutually contacting edge members 84, 84 have the same thickness as shown in FIG. 1. The two honeycomb panels 80a, 80b have the same thickness.

The welding procedure in the embodiment of FIG. 11 corresponds to the one shown in FIG. 1. The height of the projection 52 of the rotary tool 50 is larger than the thickness of the face plates 81, 82. This allows the face plates 81, 82 and the edge members 84, 84 to be welded. The load acting on the panels 80a, 80b is transmitted mainly by the edge members 84. After being fabricated, the panels 80a, 80b are assembled and friction stir welded.

Figure 12:
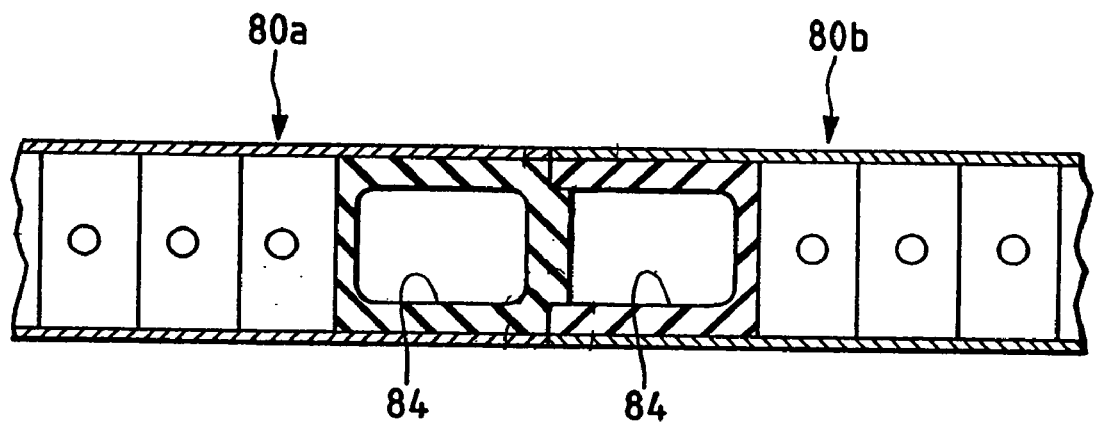
FIG. 12 is a vertical cross section of a further embodiment of this invention.

The embodiment of FIG. 12 corresponds to the one shown in FIG. 3. The edge member 84 of the honeycomb panel 80a has a generally rectangular cross section and has recesses at the corners. The edge member 84 of the honeycomb panel 80b is like a channel, with its opening facing the honeycomb panel 80a. The open ends of the edge member 84 are mounted on the recessed portions of the edge member 84 of the honeycomb panel 80a.

The honeycomb panel corresponding to FIG. 5 can be fabricated in a similar manner.

Figure 13:
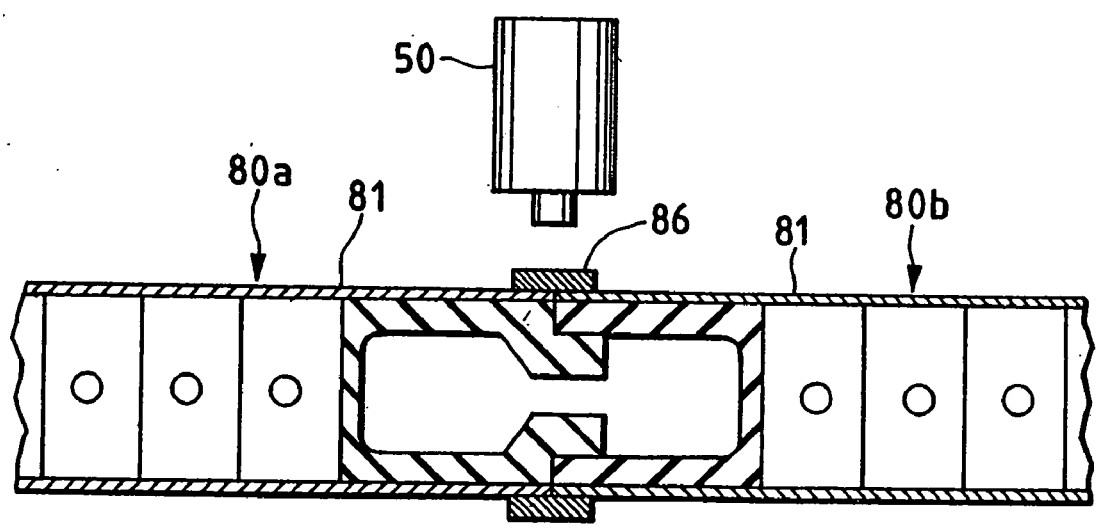
FIG. 13 is a vertical cross section of a further embodiment of this invention.

FIG. 13 shows still another embodiment that corresponds to FIG. 7. After two honeycomb panels 80a, 80b are assembled, a plate 86 is placed on the face plates 81, 81 and temporarily welded to them. The plate 86 makes up for the material that is plasticized and flows out. In FIG. 12, one vertical piece of the edge member of the honeycomb panel 80a is removed. The vertical force is supported by the thickness of the horizontal piece of the edge member 84 and the surrounding parts.

Figure 14:
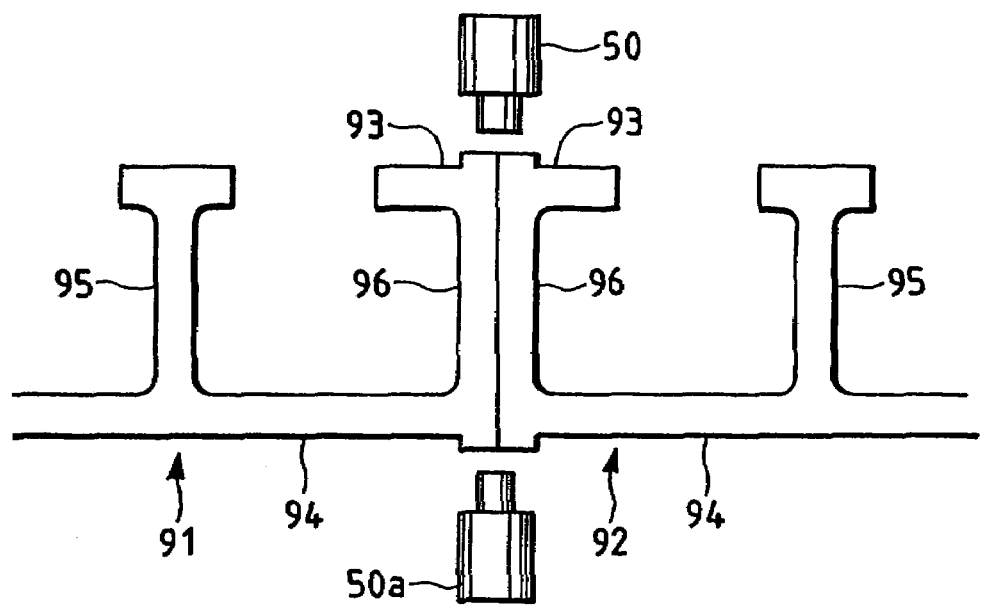
FIG. 14 is a vertical cross section of a further embodiment of this invention.

FIG. 14 shows a further embodiment of this invention. The preceding embodiments up to FIG. 13 include panels having two faces (face plates), whereas the embodiment of FIG. 14 includes panels 91, 92 having virtually a single face (face plates 94, 94). Friction stir welding is performed at two locations, at the abutting ends of the panels 91, 92, the outside with face plates 94 and the inner side with no face plates. Therefore, the joint regions on the inner side are provided with narrow face plates (face plates 93, 93). The narrow face plates 93, 93 are supported by vertical plates 96, 96. In this example, too, the vertical plates 96 are virtually perpendicular to the face plates 93,94. The face plates 93, 94 are provided with raised portions 37a, 38a similar to the ones shown in FIG. 7. The face plates 94, 94 have a plurality of reinforcing ribs (plates) 95, 95 at specified intervals. The ribs 95 are T-shaped in cross section. The top surfaces of the ribs 95 are flush with those of the face plates 93 of the joint region. To the top surfaces reinforcing members (such as pillars) may be welded, or the top surfaces serve as mounting seats for articles. Further, the face plates 93, 93 also serve as a seat for controlling the height of the tool 50. A movable body carrying the tool 50 travels along the face plates 93, 93. Because of the provision of the face plates 93, 94, the panels 91, 92 can also be said to form a two-face structure. The panels 91, 92 are extruded shape members.

While FIG. 14 shows the vertical plates 96, 96 of the panels 91 and 92 opposing each other at the joint region, as in the configuration of FIG. 1, it is possible to place one of the vertical plates over the other, as shown in FIG. 3, 5 and 7.

Figure 15:
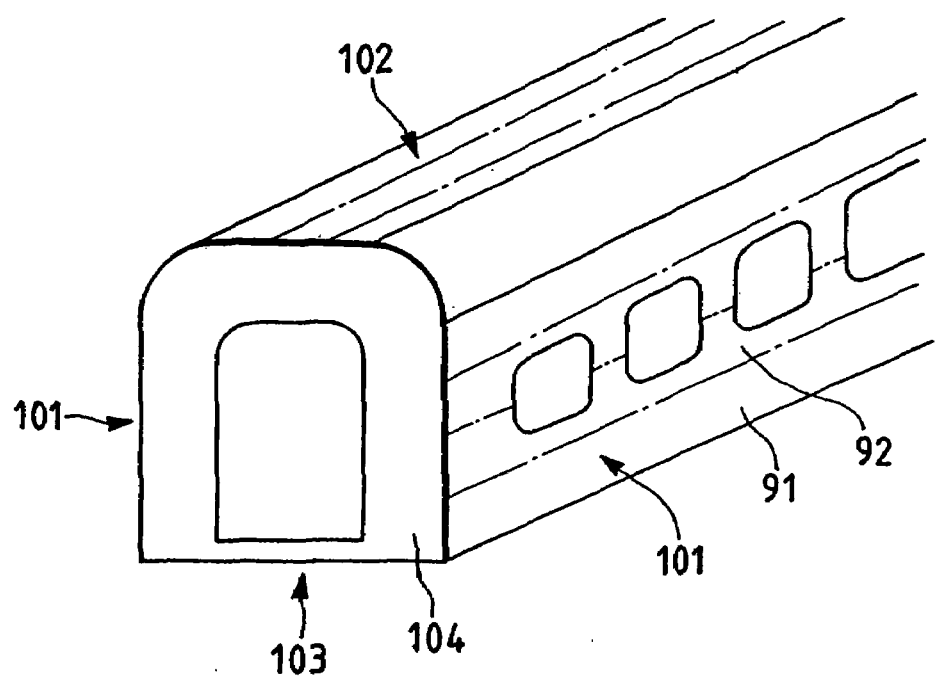
FIG. 15 is a perspective view of a structural body of a railway car.

FIG. 15 shows an example of application of this invention to the structural body of a railway car. The structural body has side bodies 101, a roof body 102, a floor body 103, and gable bodies 104 at the ends in the longitudinal direction. The side bodies 101 and the roof body 102 have panels 31, 32, 80a, 80b, 91, 92 whose long sides are oriented in the longitudinal direction of the car. The joint between the side bodies 101 and the roof body 102 and between the side bodies 101 and the floor body 103 is accomplished by MIG welding. The roof body 102 and the side bodies 101 are often shaped into arcs in cross section. When the panels 91, 92 are used for the side bodies 101, the side having the vertical plates 96 and ribs 96 is made to face to the interior of the car and the reinforcing members constitute pillars.

The panels 31, 32 of FIG. 9 may be combined in a mirror-image arrangement. The end of the projecting plate 34a of each panel is placed on the recessed portion 39 of the plate 33 of the other panel. This obviates the use of the joint 60 and allows for simultaneous friction stir welding of the joint region both from above and below. The plates 33, 34a can be provided with raised portions, as shown in FIG. 7.

What is claimed is:

1. A panel structure comprising a first plate, a second plate substantially in parallel to said first plate, and plural ribs for connecting said first plate and said second plate, wherein:
   an end portion, in a width direction, of both said first plate and said second plate is connected by a vertical plate member which is substantially perpendicular to said first plate;
   at a connection portion for connecting at least said first plate and said vertical plate member or said second plate and said vertical plate member, a recessed portion is provided;
   said recessed portion lies in a range of an extension line of a plate thickness of said vertical plate member, and does not extend beyond said range of an extension line of a plate thickness of said vertical plate member;
   said recessed portion opens at least to a thickness direction of said first plate or a thickness direction of said second plate and in a direction perpendicular to said thickness direction; and
   said connection portion being capable of having friction stir welding carried out thereon, so as to friction stir weld said panel structure and another panel structure having a portion thereof provided in said recessed portion, and to said connection portion for connecting said first plate and said vertical plate member or said connection portion for connecting said second plate and said vertical plate member, the friction stir welding is adapted to be carried out; and
   said friction stir welding is carried out from an outer side of an extension line of a plate thickness of said vertical plate member.

2. A panel structure according to claim 1, wherein said connection portion is capable of having friction stir welding carried out thereon such that a joining bead formed by carrying out the friction stir welding lies at least in a range of said plate thickness of said vertical plate member.

3. A panel structure according to claim 2, wherein a central part of said joining bead overlies a central portion of the plate thickness of the vertical plate member.

4. A panel structure according to claim 3, wherein said connection portion is capable of having the friction stir welding carried out thereon such that said joining bead extends below said recessed portion.

5. A panel structure according to claim 2, wherein said connection portion is capable of having the friction stir welding carried out thereon such that said joining bead extends below said recessed portion.

6. A panel structure according to claim 1, wherein said connection portion is capable of having a rotary tool for said friction stir welding inserted therein, from said outer side, so as to carry out the friction stir welding of said panel structure and said another panel structure.

7. A panel structure comprising a first plate, a second plate substantially in parallel to said first plate, and plural ribs for connecting said first plate and said second plate, wherein:
   an end portion, in a width direction, of both said first plate and said second plate is connected by a vertical plate member which is substantially perpendicular to said first plate;
   at a connection portion for connecting at least said first plate and said vertical plate member or said second plate and said vertical plate member, a recessed portion is provided;
   said recessed portion lies in a range of an extension line of a plate thickness of said vertical plate member;
   said recessed portion opens at least to a thickness direction of said first plate or a thickness direction of said second plate and in a direction perpendicular to said thickness direction;
   said connection portion being capable of having friction stir welding carried out thereon, so as to friction stir weld said panel structure and another panel structure having a portion thereof provided in said recessed portion, and to said connection portion for connecting said first plate and said vertical plate member or said connection portion for connecting said second plate and said vertical plate member, the friction stir welding is adapted to be carried out;

said friction stir welding is carried out from an outer side of an extension line of a plate thickness of said vertical plate member; and an edge forming the recessed portion, extending in the thickness direction, lies within a range of an extension line of the plate thickness of said vertical plate member.

8. A panel structure according to claim 7, wherein said connection portion is capable of having friction stir welding carried out thereon such that a joining bead formed by carrying out the friction stir welding lies at least in a range of said plate thickness of said vertical plate member.

9. A panel structure according to claim 8, wherein a central part of said joining bead overlies a central portion of the plate thickness of the vertical plate member.

10. A panel structure according to claim 9, wherein said connection portion is capable of having the friction stir welding carried out thereon such that said joining bead extends below said recessed portion.

11. A panel structure according to claim 8, wherein said connection portion is capable of having the friction stir welding carried out thereon such that said joining bead extends below said recessed portion.

12. A panel structure according to claim 7, wherein said connection portion is capable of having a rotary tool for said friction stir welding inserted therein, from said outer side, so as to carry out the friction stir welding of said panel structure and said another panel structure.

\* \* \* \* \*